May 22, 1923.
E. B. THURSTON
ELECTROMECHANICAL BRAKE
Filed Nov. 12, 1918  3 Sheets-Sheet 1
1,455,895
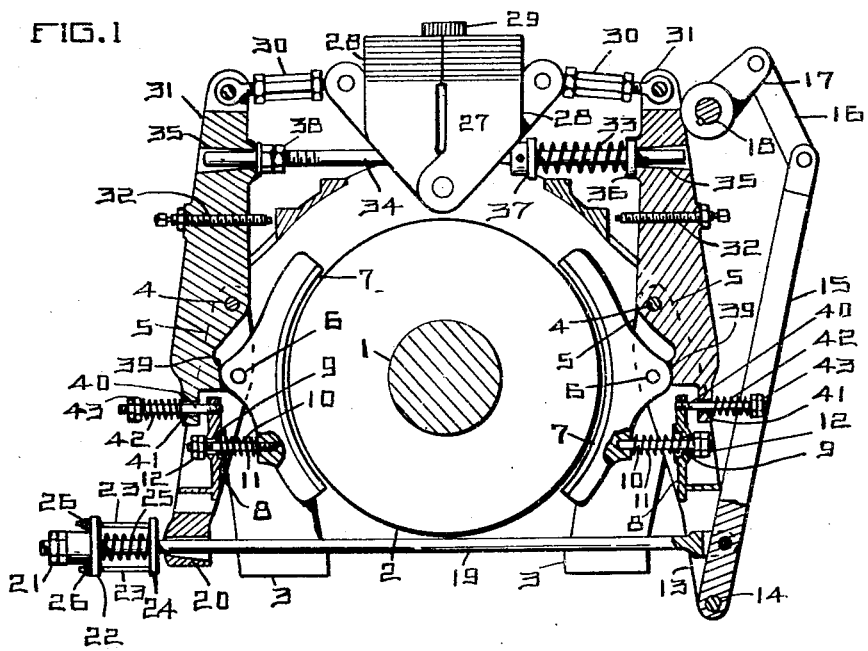
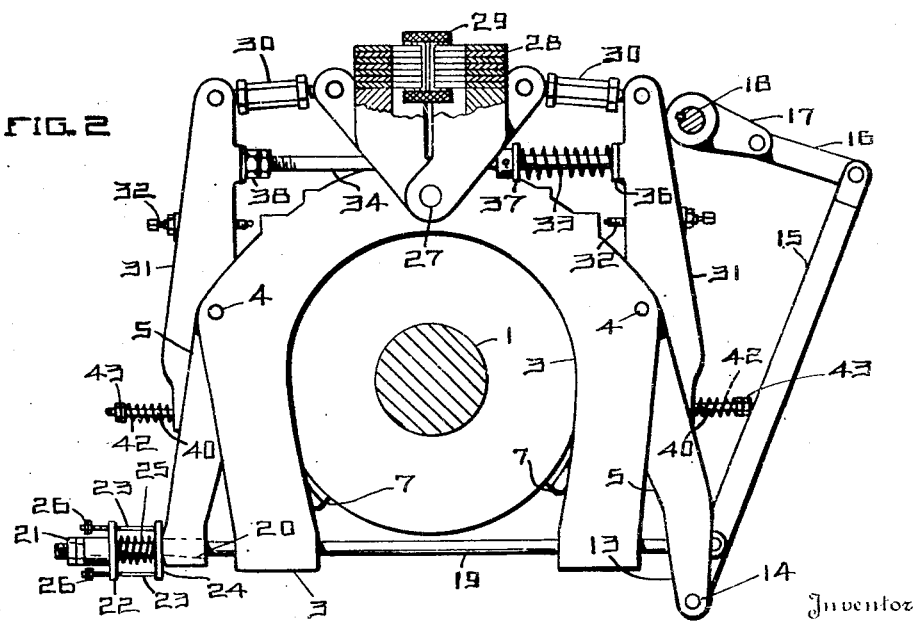
Inventor
Ernest B Thurston
By Geo E Kirk
Attorney

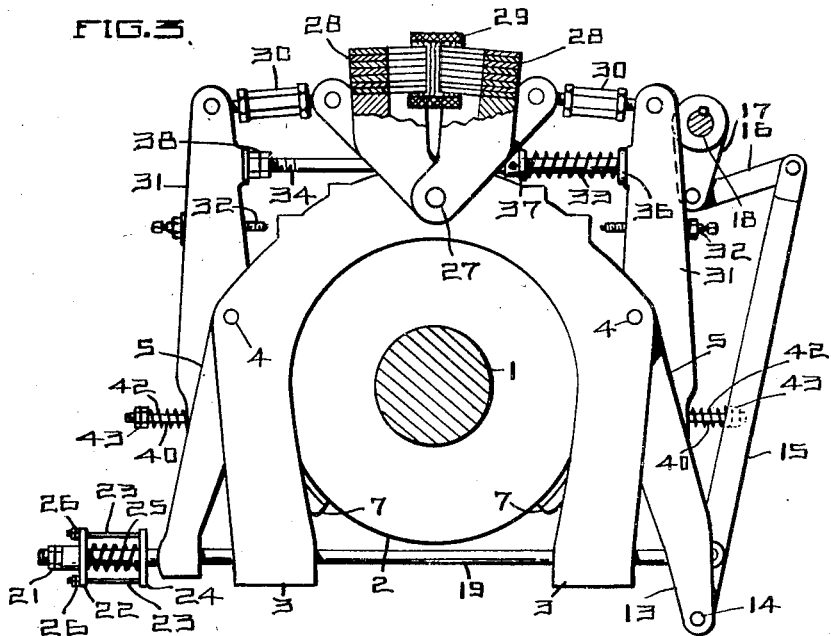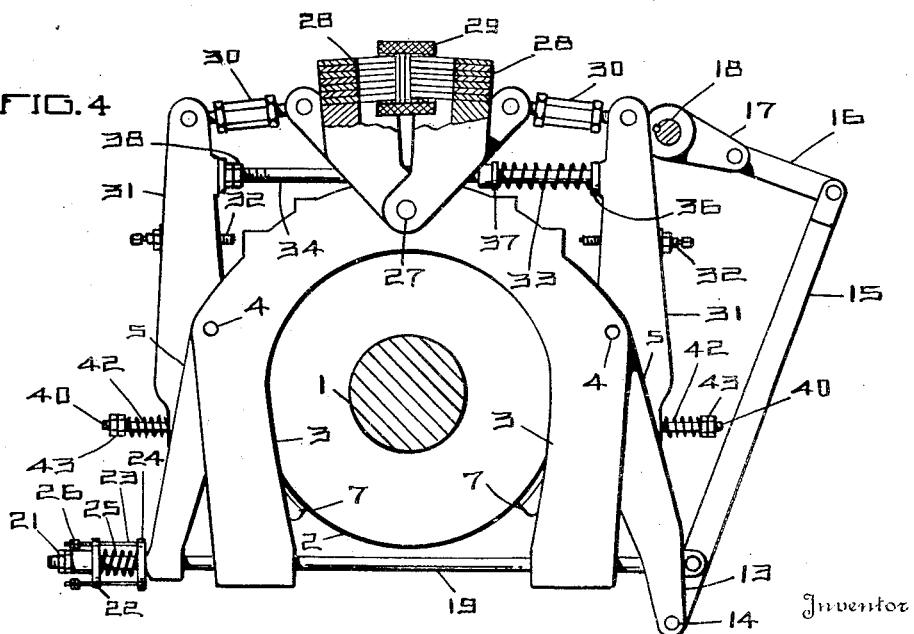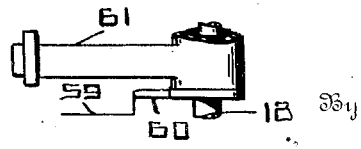

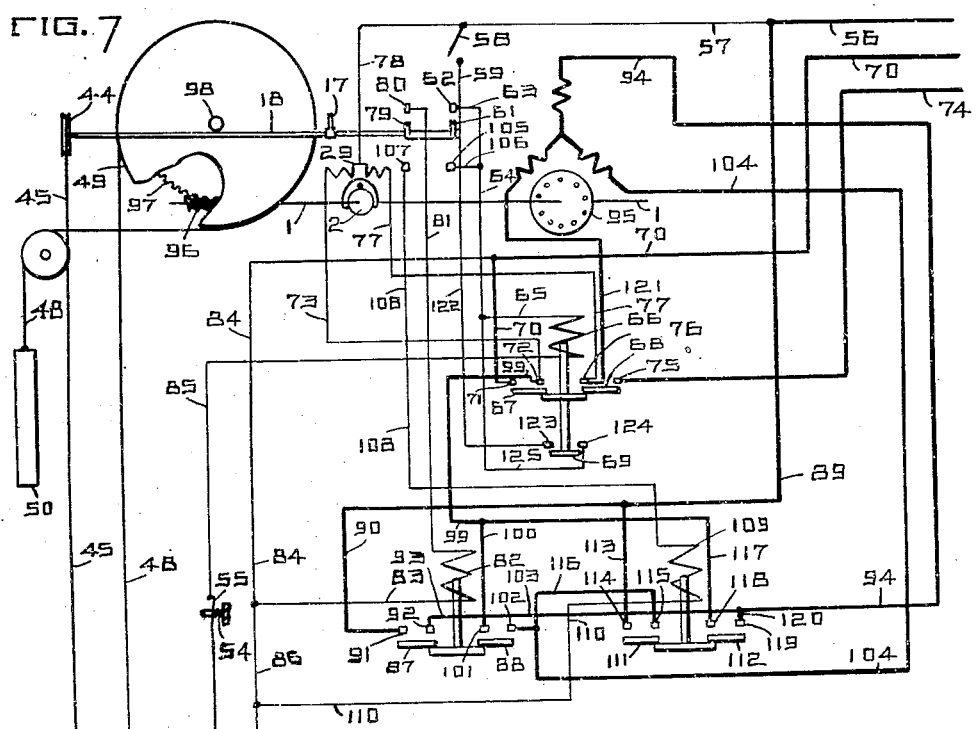
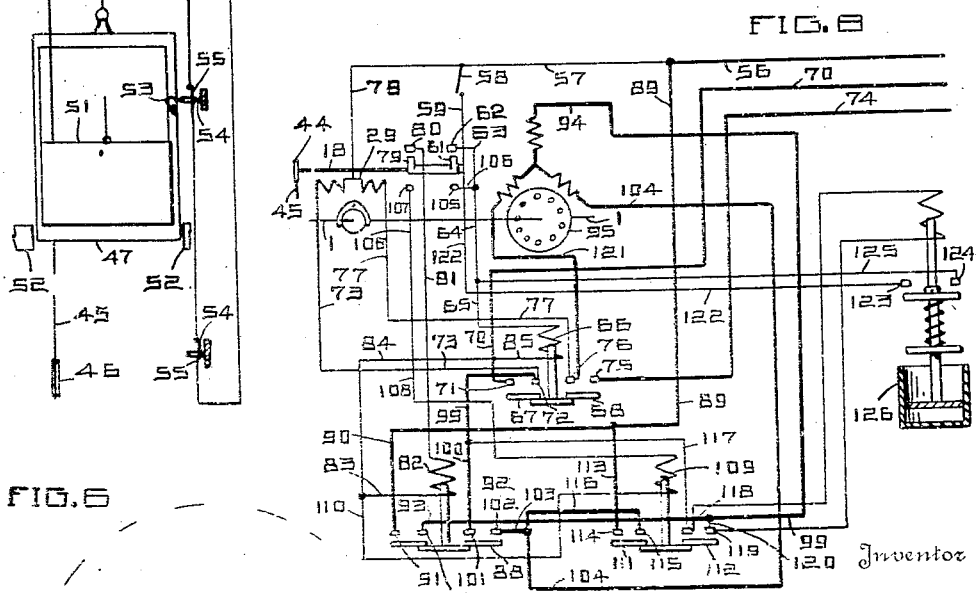
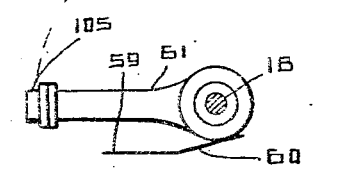

Patented May 22, 1923.

1,455,895

UNITED STATES PATENT OFFICE.

ERNEST B. THURSTON, OF TOLEDO, OHIO, ASSIGNOR TO THE HAUGHTON ELEVATOR & MACHINE CO., OF TOLEDO, OHIO, A CORPORATION OF OHIO.

ELECTROMECHANICAL BRAKE.

Application filed November 12, 1918. Serial No. 262,113.

*To all whom it may concern:*

Be it known that I, ERNEST B. THURSTON, a citizen of the United States of America, residing at Toledo, Lucas County, Ohio, have invented new and useful Electromechanical Brakes, of which the following is a specification.

This invention relates to control devices, particularly for determining a definite stop for a traveling member.

This invention has utility when incorporated in brakes, especially for traveling cars, as elevators in effecting definite landing stops at the floors under widely varying conditions of load for the cars.

Referring to the drawings:

Fig. 1 is a side elevation of an embodiment of the invention in an electro-mechanical elevator brake with the electrical control in released position, also the mechanical control in released position, and the brake shoes free from the brake drum; parts being broken away;

Fig. 2 is a side elevation of the brake of Fig. 1, with the electrical control in released position, but with the mechanical control effective in forcing the brake shoes into brake drum engaging position;

Fig. 3 is a view in side elevation of the brake of Fig. 1, with the mechanical control in released position, but with the electrical control effective, as for an emergency or terminal stop, in permitting the spring to set the brake shoes against the brake drum;

Fig. 4 is a side elevation of the brake of Fig. 1 with both the electrical and mechanical control effective in permitting and shifting the brake shoes to brake drum holding position;

Fig. 5 is a detail view of a controller switch arm;

Fig. 6 is a side elevation of the arm of Fig. 5;

Fig. 7 is a wiring diagram of the driving and control connections for an electro-mechanical brake and elevator, wherein the normal sequence for permitting electrical operation in spring setting of the brake shoes occurs after the car stops, as by lifting or opening a car gate or landing door;

Fig. 8 is a wiring diagram of driving and control connections for an electro-mechanical brake with retarded electric control.

Mounted on the shaft 1 is the brake drum 2 adjacent which is mounted a fixed frame 3 as an arch over the drum 2. Parallel to the shaft 1 the frame 3 carries bearing pins 4. From each pin 4 swings a suspended or downwardly hanging arm 5 carrying a pivot pin 6 for a brake shoe 7. The brake shoes 7 are of rigid arc form, oppose each other and are positively held against movement about the brake drum 2 while pivoted to freely swing thereagainst. The arms 5 are forked toward each end with an intermediate web 8 having a slot 9 for stud bolt 10 threaded into the brake shoes. About each bolt 10 between the brake shoe 7 and web 8 is a helical spring 11, while on the opposite side of the web 8 adjusting nuts 12 coact for limiting rocking movement of the shoe 7 on its pivot pin 6 or against adhering to the drum 2 upon outward swinging of the arm 5, still leaving the shoe 7 so it may rock to conform to proper seating against the drum 2.

One arm 5 has an extension 13 for fulcrum pin 14 of lever 15, which has its upper free end connected by link 16 to arm 17 fast with the shipper or controller shaft 18, on a fixed axis, and usually manually rockable or shiftable from a remote point, as the relatively travelling elevator car. Extending from the lever 15 is a link 19 loosely passing through opening 20 in the opposite arm 5 and terminally equipped with nuts 21 for adjusting the position of crosshead 22 through which may freely slide bolts 23 fast with crosshead 24 loose on the link 19 and urged toward the arm 5 by helical spring 25 about the link 19 between the cross heads 22, 24. The throw of the cross-head 24 away from the cross-head 22 may be limited by the nuts 26 on the bolts 23. In mechanical setting of the brake shoes 7 against the drum 2, the shipper shaft 18 may be rocked from the position in Fig. 1 to the position in Fig. 2, thereby compressing the spring 25 for distributing a like pulling effect upon each arm 5 in swinging the brake shoes 7 against the drum 2. By this link connection between the arms 5, they are left free for inward movement toward brake shoe applying position at all times when the floating lever 15 is in inactive position.

This independence of possible movement of the arms 5 as to the mechanical control, in the disclosure herein, allows these arms, shoes and drum a fully responsive separate actuation control toward holding position, as by electro-magnetic means. The upper portion of the frame 3 may carry a bearing pin 27 upon which may rock a pair of multi-pole core carrying members 28 when drawn toward each other upon energizing of the coil 29 about an intermediate pair of opposing poles. Extending from each member 28 is an adjustable link 30 connected to upstanding arm 31 of a lever mounted upon the bearing pin 4 between the forks of suspended arm 5. The drawing of the members 28 toward closed or sealing position as effected by the energizing coil 29, may be adjusted by bolts 32 carried by the respective arms 31 and movable to abut the frame 3. The members 28 are normally thrust apart or away from sealing position by helical spring 33 about rod 34 loosely extending into openings 35 in the levers 31 and coacting between loose washer 36 against one lever 31 and against washer 37 fast on the rod 34 to have the rod 34 transmit the outward thrust through adjustable fixed washer 38 to the other lever 31. The spring 33 is normally effective to be overcome by energizing of the coil 29, but at once upon deenergizing thereof operates to thrust the levers 31 outward in breaking the sealing between the members 28. As each lever 31 has a downward extension 39 coacting with a brake shoe 7 back of its pivot pin 6, such outward thrusting of the upper ends of the levers 31, at once throws the brake shoes 7 against the drum 2 and shifts the arms 5 inward also. This latter action is permitted by the extensible loose link 19, should the mechanical control be not in position for setting the brake, as shown in Fig. 3. Accordingly the electromagnetic release makes the spring 33 at once effective for direct setting of the brake entirely unhindered by any means apart from brake setting position of the additional brake control mechanism, herein shown as mechanical. The webs 8 of the arms 5 provide mounting means for bolts 40 extending loosely through openings 41 near the lower extremities of the levers 31. Helical springs 42 are adjusted on these bolts 40 by nuts 43, thus permitting energizing of the coil 29 in its rocking of the levers 31 to yieldably swing the arms 5 outward in withdrawing the brake shoes 7 from the drum 2. This yielding connection permits the mechanical swinging of the arms 5 as actuated from the lever 15, for throwing the shoes 7 against the drum 2, even when the coil 29 is energized and holding the levers 31 inward at the top. With the electrical and mechanical controls each operated for setting the brake shoes, the mechanisms are in the position shown in Fig. 4.

In the instance of electrical control, say in a three phase alternating electric power circuit for elevators, the device may be installed as shown in Fig. 7. The control or shipper shaft 18 may be provided with a sheave 44 about which extends line 45 in the elevator shaft, which also extends about remote sheave 46 so that this line 45 is accessible from elevator car 47 traveling in the shaft as actuable by hoist line 48 about drum 49 extending to counterweight 50. The car 47 is provided with a gate or door 51 which in its travel to open or lifted position adjacent a landing 52 may rock an arm 53, and against the resistance of a spring 54 open a switch 55. These switches 55 are normally held closed by the springs 54.

Electric power line 56 may have branch 57 past safety device switch 58 (as terminal stops), to line 59, brush 60 to arm 61 (Fig. 6) on the control shaft 18. This arm 61 may close a circuit with terminal 62 through lines 63, 64, 65, to coil 66 effective for closing circuits through terminals at contacts 67, 68, 69. Power line 70 extends to terminal 71 at contact 67 permitting current to flow by way of terminal 72 and line 73 to one side of brake coil 29. Power line 74 extends to terminal 75 at contact 68 permitting current flow by way of terminal 76 and line 77 to the opposite side of the coil 29 to which coil 29 the line 56 is connected by branches 57, 78. This positioning of the control shaft 18 resulting in the energizing of the coil 29 for electro-magnetic release of the brake shoes 7 from the drum 2, places the shaft 18 in position so that its arm 17 is as shown in Fig. 1 for mechanical release also.

At this position of the control shaft 18, its arm 79, similar to arm 61, comes into position against contact 80 connected to line 81 extending to coil 82 from which line 83 extends to complete the circuit through line 84 to line 70. The circuit through the coil 66 is completed by line 85 past the switches 55, and by line 86 to the lines 84, 70. While the coil 66 may be considered as controlling the switch effecting electric brake release, the coil 82 is one of the direction switches having the contacts 87, 88. From the line 56 extends lines 89, 90, to terminal 91, effective through contact 87 to close circuit with terminal 92 and lines 93, 94 to the motor 95 mounted on the shaft 1, carrying a worm 96 in mesh with worm wheel 97 on shaft 98 carrying the elevator hoisting drum 49. From the terminal 72 extends lines 99, 100, to terminal 101 effective through the contact 88 for closing circuit through terminal 102 and lines 103, 104 to the motor 95 for one direction driving thereof.

For reverse direction driving, the shaft 18 is oppositely rocked. The arm 61 then closes circuit through terminal 105 and line 106, to lines 64, 65 and coil 66, as in the former instance, while the arm 79 is moved to terminal 107, closing circuit through line 108 to coil 109 of a direction switch, instead of the coil 82. The circuit through the coil 109 is completed by line 110, lines 84, 70. Energizing of the coil 109 is effective to shift the contacts 111, 112. From the line 89, line 113 extends to terminal 114 at contact 111, for closing circuit to the terminal 115, line 116, and the line 104. From the line 99 extends line 117 to terminal 118 at contact 112 for closing circuit to the terminal 119 and by line 120, and line 94 to the motor 95, the third line to which from the terminal 76 is line 121.

Accordingly regardless of the direction of running of the motor 95 for either raising or lowering of the elevator car 47, the brake coil 29 is energized for free running, and the arm 17 is in position insuring the mechanical release of the shoes 7 from the brake drum 2.

The shifting of the arm 79 away from terminal 80 or 107 at once opens the switch at coil 82 or at the coil 109, so that the driving means or power actuation of the motor 95 is discontinued. This rocking of the shaft 18 simultaneously shifts the arm 61, but this does not de-energize the coil 66, for from the line 59 extends line 122 to terminal 123 engaged by contact 69 when the coil 66 is energized, so current may continue to flow through said coil 66 by way of terminal 124, line 125 and the line 65. In practice this means that the elevator operator in approaching a floor or landing 52 may shut off the driving power from the motor and allow the car to coast toward the desired landing register, by but a slight movement of the shaft 18. The stop at the landing, or gradual braking to approximate such stopping may be effected by slight additional movements of the shaft 18, so that the arm 17, and link 16 may act upon the lever 15 for the desired holding action upon the brake shoes 7 as brought about through the link 19 and arms 5 independently of the levers 31. With the car 47 brought to rest, the opening of a car door or landing gate may automatically break the circuit in the line 85, by opening a switch 55, thus de-energizing the coil 66 and brake coil 29, with the electro-magnetic means rendered ineffective, and the spring 33 throwing the arms 31 into brake drum holding position for the shoes 7, thus positively holding the car 47 against any shifting from the landing due to load addition or removal, which might effect the mechanical holding. As the electric release is automatically brought about before load change may occur, as by the gate or door opening, safety is assured.

Instead of the time interval being indefinite for the electrical release for brake setting, as shown in Fig. 7, a definite lag interval of a desired number of seconds or fractions thereof may be had in automatic operation by a dashpot 126, holding the coil 66 for the brake coil 29 to be energized during a brief interval while the elevator operator may with more or less rapidity rock the shaft 18 away from car driving position into mechanical brake applying position to accurately register with a landing as the electric release acts.

Variations in elevator car loadings as well as travel rate of the car in approaching a landing, introduce changing factors in the coasting distance, after the shutting off of power. An immediate rigid stop is harmful to the installation. Gradual expenditure of momentum is cared for hereunder accurately under the control of the operator for quick and desired definiteness in landing stops, with the electrical release supplementing the mechanical initial holding for maintaining the car against dropping or lifting with the great danger incident to such unexpected occurrences. There is only the single or usual controller, but it has multiple functions. First it may disconnect the driving power, then it may gradually or rapidly apply the mechanical brake for slowing up the car to a landing stop. This may be at once followed by the positive restraint of the electrical release brake means, as retarded in timing by the dash pot 126, or by a gate or door opening for loading or unloading operations. These manual control niceties for effecting desired positions for stopping the car in no wise interfere with emergency electric release stopping of the car by opening of switch 58 or other cessation of current, for immediately the coil 29 is de-energized, the shoes 7 are at once applied by the spring 33.

In order that the rocking of the control shaft 18, whether to bring the arm 17 down from the position in Fig. 1, or in its swing upward toward the straight line position with link 16, there is in the mechanical control released position slight clearance between the crosshead 24 and the arm 5, permitting driving actuation to be discontinued before the mechanical braking occurs.

What is claimed and it is desired to secure by Letters Patent is:

1. A driving member, an actuator therefor, first and second control holding means for the member, and connections for controllably applying the first holding means during member continued operation, said second holding means being operable in sequence after the discontinuance of driving operation and after the first holding means is operated.

2. A brake drum, driving means therefor, a brake shoe for the drum, spring means normally setting said shoe to hold the drum, electromagnetic means including a pair of relatively movable members opposing said spring means and effective to release the drum during drum actuation by the driving means, said brake shoe being movable to holding position independently of electromagnetic means operation or holding, and mechanical means movable independently of the electromagnetic means for setting the brake shoe in advance of the electromagnetic means operation.

3. A brake drum, driving means therefor, a brake shoe for the drum, spring means normally setting said shoe to hold the drum, electromagnetic means opposing said spring means and effective to release the shoe from the drum, and additional brake shoe setting means operable for causing the shoe to grip the drum while said electromagnetic means may hold the spring means with the driving means stopped.

4. An electromagnet, a member to be rocked thereby, spring means normally opposing the electromagnet operation of said member, said member having an extension, and a brake shoe shiftable independently of the electromagnet operation or holding, there being connecting means from said extension for actuating said shoe.

5. A brake drum, a brake shoe therefor, a pivoted mounting for the shoe to rock into position as to the drum, said mounting comprising an arm, a lever for actuating the arm, and means for actuating the arm to set the shoe against the drum independently of lever operation.

6. A brake drum, a brake shoe therefor, a pivotal mounting for the shoe comprising a swingable arm, yieldable shoe rocking limiting means coacting between the shoe and arm, and independently movable means having slack take-up connections with the arm for separately actuating the arm.

7. A brake drum, a pair of opposing brake shoes therefor, a frame, a pair of arms suspended by the frame and pivotally carrying the shoes, an adjustable yieldable take-up for each shoe restricting shoe rocking as to the respective arms, a lever fulcrummed to one arm and having yieldable take-up link connection to the other arm, and means for operating the lever.

8. A brake drum, a pair of opposing brake shoes therefor, a frame, a pair of arms mounted on the frame and swingable to mount the brake shoes, and a pair of frame carried levers movable to actuate the arm carried shoes, said arms and shoes being movable independently of said levers.

9. A brake drum, a brake shoe therefor, a frame, an arm swingably mounted in the frame and pivotally carrying the shoe, an arm actuating lever, and adjustable yieldable means therebetween permitting shoe movement to drum engaging position independently of the lever actuation.

10. A brake drum, a brake shoe therefor, a frame, an arm swingably mounted in the frame and pivotally carrying the shoe, and an arm actuating lever mounted in the frame and having its fulcrum coincide with the arm mounting in the frame, said lever having an extension for positively throwing the shoe toward the drum.

11. A brake drum, a pair of opposing brake shoes therefor, a frame providing a pair of bearings, a lever and arm mounted by each bearing, said arms carrying the shoes, said levers movable to throw positively the shoes against the drum, and means for shifting the arms to bring the shoes into drum engaging position independently of lever actuation.

12. A brake drum, a pair of opposing brake shoes therefor, a frame providing a pair of bearings, a shoe carrying arm and a shoe actuating lever mounted in each bearing, a coil mounted by the frame, movable core means actuable from the coil, and linkage from the core means to the levers for shifting the shoes as to drum.

13. A brake drum, a pair of opposing brake shoes therefor, a frame providing a pair of bearings, a shoe carrying arm and a shoe actuating lever mounted in each bearing, a rod extending between said levers, a spring thereon normally thrusting the levers into position for setting the shoes against the drum, electrically controlled means for overcoming the spring, and additional means for actuating the arms independently of the levers for setting the shoes against the drum.

14. A brake drum, a brake shoe therefor, a frame, an arm connected to the frame in which arm the shoe is pivotally mounted against arc travel about the drum, a plurality of means each movable independently of the other for actuating the arm to apply the brake shoe to the drum regardless of the position of the other means, and a common control coacting upon said plurality of means to effect release of the brake shoe from holding position as to the drum.

In witness whereof I affix my signature.

ERNEST B. THURSTON.